Feb. 15, 1927.
F. HENNEBÖHLE
1,617,711
COMBINED RELIEF AND VACUUM VALVE
Filed Aug. 26, 1926
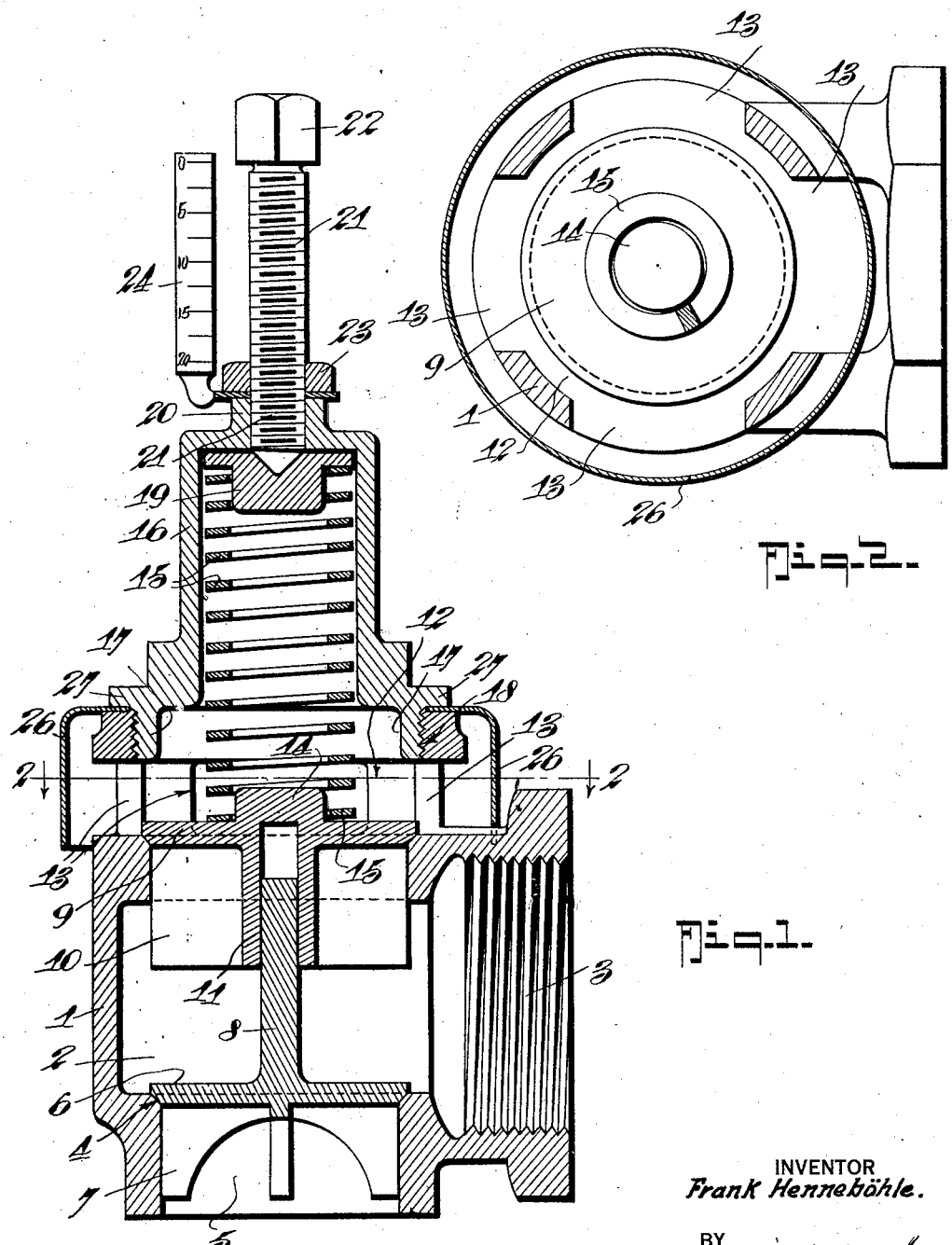
INVENTOR
Frank Henneböhle.
BY
Albert E. Dieterich
ATTORNEY Patented Feb. 15, 1927.

1,617,711

UNITED STATES PATENT OFFICE.

FRANK HENNEBÖHLE, OF CHICAGO, ILLINOIS.

COMBINED RELIEF AND VACUUM VALVE.

Application filed August 26, 1926. Serial No. 131,710.

My invention relates to valves especially adapted for use in connection with oil and gasoline storage tanks of large capacity and it particularly has for its object to provide a means for holding a normal pressure within the tank and a means to relieve the pressure should it rise above the normal or a predetermined amount; the invention also provides for admitting air into the tank, should the pressure fall below atmospheric, without destroying the seating of the pressure relief valve.

Again it is an object to provide a combined pressure relief and vacuum valve which is weather-proof, will not freeze up in cold weather, a valve in which the pressure graduating instrumentality will be protected against ingress of rain or snow which might interfere with the proper action thereof.

A further object is to provide means whereby one of the valves will serve as a guide and limiting stop for the other valve (preferably the pressure relief valve proper serving as a guide for the stem of the vacuum valve proper).

Among the objects of the invention is that of providing a quick and convenient means to determine or set the valve tension spring to hold the valve closed when the pressure in the tank is below the amount for which the valve is set.

The above objects are accomplished by the structure shown in the accompanying drawing in which:

Figure 1 is a vertical longitudinal section of my invention.

Figure 2 is a cross section on the line 2—2 of Figure 1.

In the drawing in which like numerals of reference indicate like parts in all the figures, 1 represents the valve housing which is provided with a main chamber 2 having an entrance 3 that is adapted to communicate with the tank or reservoir to be protected.

The valve housing has two passages communicating with the chamber 2, one of which, 5, has a valve seat 4 with which the vacuum valve 6 cooperates. The valve 6 has guide wings 7 and a stem 8, the latter working in a guideway 11 in the pressure relief valve 9. The pressure relief valve 9 has guide wings 10 as shown.

The valve housing 1 has its other passage communicating with an outlet chamber 12 that has outlets 13 to atmosphere, the outlet 12 having a threaded opening 18 to receive the threaded neck 17 of the pressure valve spring housing 16.

The pressure relief valve 9 has a spring guide lug 14 that projects into the lower end of the pressure spring 15, the upper end of which engages the flange of a button 19 that is socketed to receive the end of the tension screw 21 that is threaded into the threaded neck 20 of the pressure relief valve spring housing 16.

The spring adjusting screw 21 has a head 22, the lower edge of which may be used in cooperating with the graduated scale plate 24 which is held by its washer-like flange 25 between the neck 20 and the jam nut 23. The scale plate 24 is graduated in suitable values to determine the number of pounds pressure the spring 15 exerts upon the valve 9. By adjusting the screw 21 up or down the tension of the spring 15 may be varied to suit the occasion.

In order to prevent rain, snow or the like from driving through the apertures 13 into the chamber 12 I provide a cup-like weather guard 26 which fits over the portion of the valve housing 1 that contains the chamber 12 and is secured by the flange 27 of the housing 16.

In operation, the entrance 3 is coupled with the tank or reservoir in which the oil or gasoline is contained. In such tank or reservoir it is customary to maintain a pressure in excess of atmospheric, usually from five to twenty pounds. The screw 21 is adjusted with relation to the scale plate 24 to apply the required pressure to the valve 9. For instance if the screw 21 is adjusted to ten pounds pressure the valves 6 and 9 will remain seated. Should the pressure within the chamber 2 (that is in communication with the tank or reservoir not shown, via passage 3) rise above ten pounds the valve 9 will lift from its seat and permit escape through chamber 12 and ports 13 until the pressure has again fallen to ten pounds when the valve 9 re-assumes its seated position.

Should the pressure fall below ten pounds and below atmospheric pressure the valve 6 will open and admit air through passage 5 into chamber 2 and from thence through passages 3 to the tank or reservoir until the pressure within the tank or reservoir has again risen to atmosphere or greater. The valve 6 functions particularly when the contents of a tank or reservoir are being drawn off for then the pressure drops below atmospheric pressure unless relieved.

While I have shown and described the valve 9 as being provided with the female arrangement of the guiding feature and the valve 6 with the male arrangement it is obvious that these may be reversed if desired, though the arrangement shown is preferred since it prevents any accumulation of moisture in the guide 11.

From the foregoing description, taken in connection with the accompanying drawing, it is thought the complete construction, operation and advantages of my invention will be clear to those skilled in the art to which it relates.

What I claim is:

1. A combined relief and vacuum valve unit comprising a housing having a main chamber with an entrance adapted to communicate with the tank whose pressure is to be controlled, said housing having an air inlet port communicating with the main chamber through a passage having a valve seat, a vacuum valve cooperating with said seat, said housing having a pressure relief chamber with outlet to atmosphere and communicating with the main chamber through a passage having a valve seat, a relief valve on said last named seat, means to apply predetermined pressures to said relief valve tending to seat it, one of said valves having a valve stem guide and the other valve having a stem cooperating with said guide, said predetermined pressure applying means comprising a spring housing secured to said first mentioned housing and communicating with the same above the relief valve, a valve spring in said spring housing pressing on said relief valve, a pressure adjusting screw device cooperative with said spring for adjusting its tension, said screw being carried by and projected to the outside of said spring housing whereby adjustments may be made from the outside, and means for holding said screw in its adjusted positions.

2. In a combined relief and vacuum valve unit, a valve housing having a main chamber and two passages communicating between said chamber and the atmosphere, said passages each having valve seats, a relief valve associated with one seat and a vacuum valve associated with the other seat, said valves having mutual guiding parts connecting the valves for individual action, said housing having a port to effect communication between the tank to be controlled and the main chamber of the housing between the respective valves, said mutual guiding parts comprising a valve stem on the lower of said valves and a valve stem guide socket on the upper of said valves, said valves being located one below the other and means operable from the outside of the housing and including means within the housing for adjusting the action of said relief valve.

3. In a combined relief and vacuum valve unit, a valve housing having a main chamber and two passages communicating between said chamber and the atmosphere, said passages each having valve seats, a relief valve associated with one seat and a vacuum valve associated with the other seat, said valves having mutual guiding parts connecting the valves for individual action, said housing having a port to effect communication between the tank to be controlled and the main chamber of the housing between the respective valves, said housing having a threaded portion, a spring housing having a threaded portion secured to said first mentioned threaded portion and communicating with the valve housing above the relief valve, a valve spring in said spring housing pressing on said relief valve, a pressure adjusting screw and means interposed between the screw and spring whereby the tension of the spring may be adjusted by turning said screw, and a gauge associated with said screw to indicate the pressures at which said relief valves will open.

4. In a combined relief and vacuum valve unit, a valve housing having a main chamber and two passages communicating between said chamber and the atmosphere, said passages each having valve seats, a relief valve associated with one seat and a vacuum valve associated with the other seat, said valves having mutual guiding parts connecting the valves for individual action, said housing having a port to effect communication between the tank to be controlled and the main chamber of the housing between the respective valves, said housing having a threaded portion, a spring housing having a threaded portion secured to said first mentioned threaded portion and communicating with the valve housing above the relief valve, a valve spring in said spring housing pressing on said relief valve, a pressure adjusting screw and means interposed between the screw and spring whereby the tension of the spring may be adjusted by turning said screw, and a weather shield secured between the valve housing and the spring housing and projecting over the outlets to atmosphere from the relief valve for the purpose specified.

FRANK HENNEBÖHLE.